United States Patent [19]

Thomas et al.

[11] 4,287,523

[45] Sep. 1, 1981

[54] VALVE FOR INK JET PRINTER

[75] Inventors: Jacob E. Thomas; Victor J. Italiano, both of Ithaca, N.Y.

[73] Assignee: NCR Corporation, Dayton, Ohio

[21] Appl. No.: 122,106

[22] Filed: Feb. 19, 1980

[51] Int. Cl.³ .............................................. G01D 15/16
[52] U.S. Cl. ................................. 346/140 R; 137/38
[58] Field of Search ................ 346/140 R, 75; 137/38

[56] References Cited

U.S. PATENT DOCUMENTS

| 3,375,528 | 3/1968 | Klavsons | 346/140 |
|---|---|---|---|
| 3,823,409 | 7/1974 | Carrell | 346/140 |
| 3,864,685 | 2/1975 | Fischbeck | 346/140 |

Primary Examiner—Joseph W. Hartary
Attorney, Agent, or Firm—J. T. Cavender; Wilbert Hawk, Jr.; George J. Muckenthaler

[57] ABSTRACT

A rotary ink jet printer has an ink supply in a rotating reservoir wherein a major portion of the ink supply is isolated from the ink feed system during the printing operation. A cylindrical reservoir has a central cavity and a surrounding or outer cavity connected by an orifice opened and closed by means of a ball valve to control the flow of ink or ink supply from the central cavity to the outer cavity.

20 Claims, 2 Drawing Figures

VALVE FOR INK JET PRINTER

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been obtaining and maintaining the required control of the printing operation. As is well-known, the impact printing operation depends upon the movement of impact members typically by reason of an electromechanical system which is believed to enable the provision of a more precise control of the impact members.

The advent of non-impact printing as in the case of thermal printing brought out the fact that the heating cycle must be controlled in a manner to obtain a maximum number of repeated operations. Likewise, the control of ink jet printing must deal with the problem of maintaining an adequate supply of ink in the print head while pulsing the ink fluid to provide droplets of ink in successive manner during the printing operation.

Representative prior art in the field of ink jet printing includes U.S. Pat. No. 3,823,409, issued to R. M. Carrell on July 9, 1974, which discloses a rotatable paraboloid-shaped reservoir having an inner container within an outer container and forming a parabolic passageway for supplying ink from the inner container through an orifice and along the parabolic passageway to radially outwardly-directed ink jets. The parabolic passageway prevents the centrifugal force and the pressure head of the stored ink from acting on the ink adjacent the ink jets.

U.S. Pat. No. 3,854,563, issued to R. L. Cowardin et al. on Dec. 17, 1974, discloses an arcuate printer having a print head pivotable about a central point and printing in oscillating or reciprocating manner on record media formed against an arcuate platen.

U.S. Pat. No. 3,864,685, issued to K. H. Fischbeck on Feb. 4, 1975, discloses an ink cartridge in the form of a rotationally driven disk member and including a reservoir and ink jets. The reservoir comprises an inner chamber and an outer chamber with openings to allow ink to flow to the jets.

U.S. Pat. No. 3,864,696, issued to K. H. Fischbeck on Feb. 4, 1975, discloses a disk member on a rotatable shaft and a cavity for ink to be supplied to the ink jet.

U.S. Pat. No. 3,940,773, issued to A. Mizoguchi et al. on Feb. 24, 1976, discloses a fluid chamber which is divided into an outer chamber portion and an inner chamber portion with a channel connecting the portions. The outer portion is provided with an intermediate reservoir connected with a fluid supply and with a discharge channel.

U.S. Pat. No. 4,015,272, issued to K. Yamamori et al. on Mar. 29, 1976, discloses vented outer and inner chambers with a channel connecting the chambers and supplying ink to the ink jet.

U.S. Pat. No. 4,045,801, issued to K. Iwasaki on Aug. 30, 1977, discloses an ink supply chamber communicating through orifices with a pressure chamber and an ejection chamber.

And, U.S. Pat. No. 4,152,710, issued to M. Matsuba et al. on May 1, 1979, discloses an electromagnetic cross valve for selectively connecting a nozzle with an ink supply conduit and an ink liquid drain conduit.

SUMMARY OF THE INVENTION

The present invention relates to ink jet printing and more particularly, to a rotary printer having a rotating reservoir for supplying ink to a nozzle which is radially spaced from the center of rotation. In normal operation of an ink jet print head, it is well-known that a negative meniscus of ink should be maintained at the nozzle. In the case of a rotary printer, the surface of the ink takes the form of a paraboloid which causes a reduction in negative pressure at the nozzle. Since it is necessary to maintain a sufficient negative head or pressure for proper operation, the total volume of usable ink in a rotating reservoir must be less than the amount of ink in a stationary reservoir of equal diameter.

The present invention greatly increases the useful ink supply in a rotating reservoir by isolating a major portion of the supply from the ink feed system during printing operation. A cylindrical reservoir has a central cavity and an outer annular cavity formed by a wall which is sealed at the ends to allow ink to flow only through a single orifice between the two cavities. Means is provided for controlling the flow or supply of ink between the two cavities by installing valve means at the orifice and within a depression of the outer housing. The valve means is in the form of a movable ball member which is sensitive to rotation of the ink reservoir. When the reservoir is at rest, the ball member rests at the bottom of the depression and the ink is free to flow between the cavities wherein the height of the ink therein is equalized.

When the reservoir is rotated, the centrifugal force causes the ball member to move radially outward to seal the orifice and prevent flow of ink therethrough during the printing operation. Therefore, ink from the outer cavity only is supplied to the nozzle of the print head during printing operation.

In view of the above discussion, the principal object of the present invention is to provide an ink jet rotary printer with a sufficient negative pressure for proper operation.

Another object of the present invention is to provide control means in an ink jet printer operable to maintain a negative pressure at the print head.

An additional object of the present invention is to provide means for isolating a portion of the ink supply from the ink feed system during printing.

A further object of the present invention is to provide a printer having inner and outer cavities and valve means therebetween for increasing the useful ink supply in a rotating reservoir by controlling the flow of ink during printing operation.

Additional advantages and features of the present invention will become apparent and fully understood from a reading of the following description taken together with the annexed drawing.

DESCRIPTION OF THE PREFERRED EMBODIMENT

Figure 1:
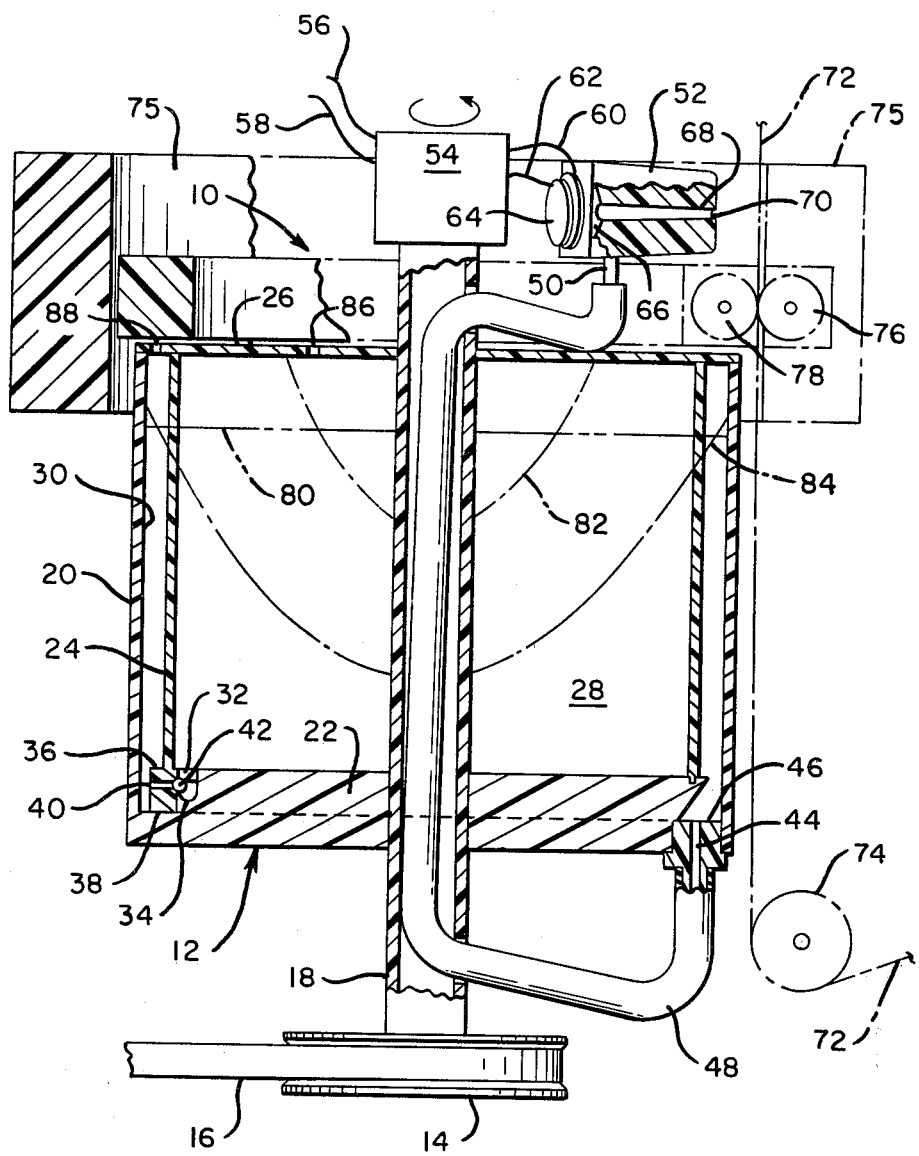
FIG. 1 is a side elevational view, partially in section and taken along the plane 1—1 of FIG. 2, of a rotary ink jet printer incorporating the subject matter of the present invention.

Prior to describing the drawing, it should be remembered that an ink jet print head normally operates with a negative meniscus (the curved upper surface of a column of liquid) of ink maintained at the print head nozzle by reason of the capillary force pulling the ink from a reservoir whose surface is open to the atmosphere and which is below the level of the nozzle within certain desired limits.

In the case of a rotary printer, as the reservoir is rotated the surface of the ink takes the form of a paraboloid which form causes a reduction in the negative pressure at the nozzle. The negative head decreases at the radial location of the nozzle, that is, the increase in head ($\Delta Z$) at a radius equal to the radial location of the nozzle is given by the following equation:

$$\Delta Z = w^2 \frac{r_2^2}{4g}$$

where
  w = angular velocity of the reservoir,
  $r_2$ = radial distance of the nozzle from the center of rotation, and
  g = gravitational acceleration.

It is necessary to maintain a sufficient negative pressure for proper printing operation and therefore the total volume of usable ink in a rotating reservoir must be less than the amount of ink in a stationary reservoir of equal diameter.

Additionally, the diameter of the reservoir should be equal to or less than the diameter of the circle which is made by the print head nozzle in order to avoid interference with the path of the paper or other record media. Further, the elevation of the bottom plane of the reservoir is determined by the maximum negative pressure required for proper print head operation. With the above constraints or requirements, the amount of ink which can be utilized is severely limited for a given diameter printer. For example, if a single nozzle is used to print at a rate of 120 lines per minute, only 1/14th (about 7%) of the volume available in a cylinder defined by a printer of two inches in diameter is available as providing the ink supply.

The present invention greatly increases the useful ink supply in a rotatable reservoir by reason of isolating a major portion of the supply from the ink feed system during printing.

Referring now to FIG. 1, a rotary ink jet printer, indicated generally as 10, includes a cylindrical reservoir 12 supported in a suitable upright manner and driven in rotatable motion by drive means which may include a pulley 14 carrying a drive belt 16 driven by a motor (not shown). The pulley 14 is secured to a tube or hollow shaft 18 for rotation thereof along with rotation of the reservoir 12. The reservoir 12 comprises an outer wall 20 which may be an integral part of a cylinder base member 22, an inner wall 24 spaced from the outer wall, and a cover 26 which encloses the overall cylinder.

The inner wall 24 and the shaft 18 provide a large volume central cavity 28 therebetween and the outer wall 20 and the inner wall 24 provide a small volume annular cavity 30 therebetween. The base member 22 is formed to have a shape which supports the inner wall 24 at the periphery of the base member except for a portion 32 removed therefrom for the formation of a recess or depression 34 (FIG. 1). The wall 24 has a block or body portion 36 positioned on a ledge 38 of the base member 22 and an orifice or passageway 40 is provided through the body portion 36 to permit ink fluid to flow from one cavity to the other cavity. The orifice 40 has a conical shaped seat on the inner end thereof for receiving a valve member in the form of a ball 42 which is caused to be moved from one position at rest in the recess or depression 34 to the orifice 40 close-off position on the conical seat as shown.

Figure 2:
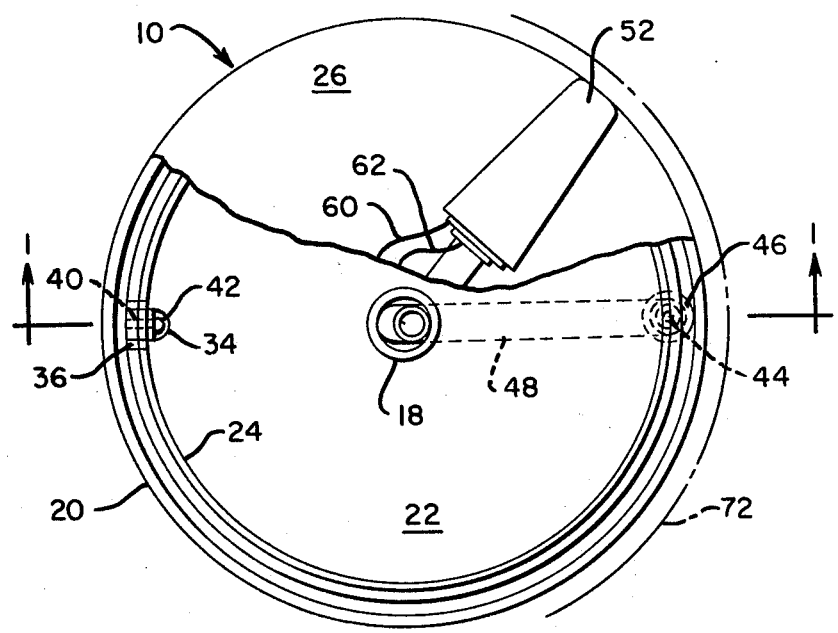
FIG. 2 is a top plan view, partially cut away, of the rotary printer shown in FIG. 1.

FIG. 2 shows the top plan view and locates the block portion 36 with the orifice 40 therethrough and the recess 34 in the base member 22. The base member 22 also includes an orifice or passageway 44 in a block portion 46 positioned between the base member 22 and the lower end of the outer wall 20 (see also FIG. 1). A supply tube or conduit 48 is fitted to the block portion 46 and extends therefrom through an opening in the wall of the tubular shaft 18 near the lower end thereof, upwardly inside the shaft 18 and through an opening in the wall of the shaft near the upper end thereof, and then is fitted to a passageway 50 connected as an input to an ink jet print head 52 carried by the conduit 48.

A print head electrical signal commutator 54 is secured to the top of the shaft 18 and has connected thereto a pair of supply leads 56 and 58 along with a pair of leads 60 and 62 extending therefrom and connecting with a piezoelectric drive element 64 of the print head 52. The print head 52 includes a chamber 66 for receiving ink fluid from the conduit 48, and a passageway 68 is provided through the print head 52 from the chamber 66 to a nozzle 70 through which ink droplets are caused to be ejected by action of the drive element 64 during the printing operation.

Paper or other record media 72 is caused to be driven around a curved guide roller 74 positioned at one side and below the reservoir 12 (FIG. 1) and supported in suitable manner to receive and guide the paper to a plane conforming with the curvature of the cylindrical reservoir 12 (FIG. 2). A suitable flume or like guide member 75 may be used to curve the paper 72 to the plane adjacent the print head 52 while a pair of rollers 76 and 78 positioned near the center of the paper may be used to drive the paper 72 past the printing station. The guide member 75 is shown as an annular member at the left side of FIG. 1 and shown in phantom at the right side with cut out portions for the rollers 76 and 78.

Prior to operation of the printer, the inner cavity 28 and the outer cavity 30 are filled with ink to a height designated as 80 and which is calculated according to the following equation:

$$H = Z_2 - \frac{w^2}{4g}(r_2^2 - r_1^2)$$

where
  $Z_2$ = the maximum allowable fill height for a non-rotating reservoir, and
  $r_1$ = inner radius of the outer cavity.

It can be seen from the above equation that the ink height, designated as 80 and indicating the surface of the ink in a full reservoir while in a stationary condition and to which the reservoir 12 can be initially filled with ink, can be increased as the inner diameter of the outer cavity 30 is increased. The presence of the valve member 42 allows the ink height to be increased in the reservoir without causing too small or an insufficient underpressure for proper printing operation. Both of these factors, the increased ink height and maintenance of proper underpressure, allow a greater volume of usable ink to be stored in the cavities 28 and 30 and it is therefore desirable to make $r_1$ nearly as large as $r_2$.

As the reservoir 12 starts to rotate and continues to rotate, centrifugal force causes the valve ball 42 to move from the bottom of the recess 34 radially outward and upward to seat on the inner conical end of the orifice 40, thereby preventing the flow of ink between the cavities 28 and 30. When the reservoir 12 and the print head 52 are rotatably operating in a printing mode, the outer cavity 30 alone is supplying ink to the print head. In other words, ink from the outer cavity 30 is drawn from the bottom thereof and up to the print head 52 through the conduit or tube 48 by reason of the action of capillary forces in the nozzle. Also, during reservoir 12 rotation at printing speed, the surface of the ink in the inner cavity 28, designated as 82, and the surface of the ink in the outer cavity 30, designated as 84, take the shape of parabolas by reason of the centrifugal forces acting on the fluid. It should also be stated that the valve member 42 prevents the ink from climbing up the wall of the outer cavity 30 in a manner not conducive to proper operation of the print head.

When the printing operation ceases, the reservoir 12 stops rotating and the ball 42 moves by reason of gravity from its seated position at the inner end of the orifice 40 to its rest position at the bottom of the recess 34, thereby permitting ink from the inner cavity 28 to pass through the orifice and replenish the outer cavity 30. Additionally, both cavities 28 and 30 are vented to the atmosphere by means of vents 86 and 88 to maintain proper negative pressure at the nozzle 70.

It is thus seen that herein shown and described is a rotary ink jet printer having valve means positioned in the flow of ink between a first or inner cavity and a second or outer cavity to increase the useful ink supply in the rotating reservoir by isolating or withholding a major portion of the ink supply from the ink feed system during the printing operation. While such reservoir in its preferred form comprises concentric cylindrical chambers, other chamber arrangements as to shape and relative positioning may likewise be utilized for defining the ink reservoir. The valve means includes a member which is freely movable from a recessed position to a seated position by reason of gravity forces and centrifugal forces, respectively, to open and close an orifice between the one cavity and the other cavity of the reservoir. The valve means between the two cavities enables the accomplishment of the objects and advantages mentioned herein, and while a preferred embodiment of the invention has been disclosed, variations thereof may include such things as a conical-shaped moving member which could be utilized and operated with a spring or like bias member to provide a restoring force acting radially inward to open the valve and thereby the orifice in the reservoir rest or non-rotational position. Such a conical-shaped member could improve the sealing effect by providing a larger surface area in contact with the seat of the orifice. In addition, while the preferred form of the invention makes use of a conduit 48 which is sufficiently rigid to both locate and maintain the print head 52 at its proper position relative to the paper 72, such head 52 may of course be appropriately positioned and maintained by independent means with the conduit 48 being flexible or rigid, as desired. Also, while a single print head and a single paper are shown, it is of course within the concept of the present invention that the valve and reservoir arrangement may be structured to accommodate additional print heads and additional printing stations may also be provided at the periphery of the rotary printer. It is contemplated that all such variations and modifications not departing from the spirit and scope of the invention hereof are to be construed in accordance with the following claims.

We claim:

1. A system for controlling the ink supply for a rotary printer having a print head for ejecting ink droplets onto record media, said system comprising a
    rotatable ink reservoir having a first cavity and a second cavity, an
    ink supply line connected with said second cavity and with said print head, and
    valve means positioned to control the flow of ink between said first cavity and said second cavity wherein the ink is free to flow between said cavities when said reservoir is at rest and wherein, responsive to centrifugal force, the ink is prevented from flowing between said cavities upon rotation of said reservoir.

2. The control system of claim 1 wherein said second cavity is of lesser volume than said first cavity.

3. The control system of claim 1 including a hollow shaft for rotating said reservoir and through which said ink supply line is trained.

4. The control system of claim 1 wherein said reservoir is cylindrical and including means for guiding said record media in a manner conforming to the curvature of the reservoir.

5. The control system of claim 1 wherein said reservoir is cylindrical and said first and second cavities are formed by concentrically placed cylinders.

6. The control system of claim 1 wherein said valve means comprises an aperture between said first and second cavities and an element movable to open and close said aperture.

7. The control system of claim 1 wherein said valve means comprises an orifice between said first cavity and said second cavity and a ball movable to close said orifice responsive to centrifugal force during rotation of said reservoir.

8. A valve assembly for isolating a portion of an ink supply to an ink jet print head in a rotary printer having a rotatable ink reservoir comprising two cavities and an ink supply line connecting one of said cavities and said print head, said valve assembly comprising a
    valve body interposed between said cavities, an
    aperture through said valve body for flow of ink between said cavities, and
    means movable in relation to said aperture permitting flow of ink between said cavities when said printer is at rest and responsive to centrifugal force during operation of said printer preventing flow of ink between said cavities.

9. The valve assembly of claim 8 wherein said one cavity is of lesser volume than the other cavity.

10. The valve assembly of claim 8 including a hollow shaft for rotating said reservoir and through which said ink supply line is trained.

11. The valve assembly of claim 8 wherein said reservoir is cylindrical and including means for guiding said record media in a manner conforming to the curvature of the reservoir.

12. The valve assembly of claim 8 wherein said reservoir is cylindrical and said two cavities are formed by concentrically placed cylinders.

13. The valve assembly of claim 8 wherein said movable means comprises a ball element movable to open and close said aperture.

14. The valve assembly of claim 8 wherein said reservoir comprises an inner cavity and an outer cavity and said movable means comprises a ball element within said inner cavity and movable to close said aperture responsive to centrifugal force of said reservoir.

15. In an ink jet printer having a print head movable in rotary direction, a rotating ink reservoir having two cavities, a line for supplying ink from one of said cavities to said print head, and control means for isolating the ink supply to said one cavity during printer operation comprising a valve body positioned at the juncture of the cavities, an aperture through said valve body for flow of ink between said cavities; and a movable member within said one cavity and responsive to centrifugal force of said rotating reservoir for closing said aperture to prevent flow of ink therethrough during printer operation.

16. In the printer of claim 15 wherein said one cavity is of lesser volume than the other cavity.

17. In the printer of claim 16 wherein said reservoir is cylindrical and comprises an inner cavity and an outer cavity for containing the supply of ink and said ink supply line is connected with said outer cavity.

18. In the printer of claim 17 wherein said inner and outer cavities are formed by concentrically placed cylinders and said movable member comprises a ball member movable to close said aperture responsive to centrifugal force during rotation of the reservoir.

19. In a printer having an ink supply within a multi-chambered rotatable reservoir and an ink feed means connecting said reservoir with a uni-rotatable ink jet printhead, valve means for isolating a major portion of said ink supply from said printhead during the printing operation, comprising an orifice interconnecting the multiple chambers of said reservoir; and a valve member free of said orifice under the influence of gravity permitting the flow of ink between each chamber of said reservoir when at rest and closing off said orifice under influence of centrifugal force for restricting flow of ink through said ink feed means from a single chamber of said reservoir during rotation thereof.

20. In the printer of claim 19 wherein said single chamber of said reservoir is of lesser volume than another chamber thereof.

* * * * *